United States Patent [19]

Steinert et al.

[11] Patent Number: 4,507,840
[45] Date of Patent: Apr. 2, 1985

[54] METHOD FOR COMPACTING NUCLEAR REACTOR COMPONENTS

[75] Inventors: Leopold A. Steinert; Richard W. Perry, both of San Jose, Calif.

[73] Assignee: General Electric Company, San Jose, Calif.

[21] Appl. No.: 486,524

[22] Filed: Apr. 19, 1983

[51] Int. Cl.³ .............................................. B23P 7/00
[52] U.S. Cl. .................................. 29/401.1; 376/272; 29/400 N; 29/403.2
[58] Field of Search ............... 29/400 N, 403.3, 403.2, 29/403.1, 401.1, 723, 402.01–402.19

[56] References Cited

U.S. PATENT DOCUMENTS 4,238,878  12/1980  Stamm et al. .......................... 29/723

FOREIGN PATENT DOCUMENTS 2942406  5/1980  Fed. Rep. of Germany ........ 29/723

Primary Examiner—Howard N. Goldberg
Assistant Examiner—V. K. Rising
Attorney, Agent, or Firm—Ivor J. James, Jr.; Raymond G. Simkins; Samuel E. Turner

[57] ABSTRACT

A method is disclosed for the compaction of control rod blades and fuel channels of a boiling water reactor. Upper and lower portions of a control rod blade are removed from a cruciform shaped main blade structure. Each elongate tubular fuel channel of substantially square cross section is sectioned into four substantially congruent panels. A plurality of panels are stacked into each quadrant of the main blade structure substantially parallel to the long axis thereof.

15 Claims, 6 Drawing Figures

METHOD FOR COMPACTING NUCLEAR REACTOR COMPONENTS

This invention relates generally to a method for compacting radioactive nuclear reactor components for subsequent storage, and in particular to a method for compacting the control rod blades and fuel channels of a boiling water nuclear reactor.

BACKGROUND OF THE INVENTION

A problem common to nuclear reactors is the safe storage of radioactive reactor components which are unfit for further use. Since available storage space is limited, the volume of the materials to be stored must be minimized. Among the components of a boiling water reactor which must be discarded after a period of use, but which remain radioactive, are the control rod blades and fuel channels of the reactor.

The control rod blades of a boiling water reactor typically have a cruciform cross section in their main blade structure, comprising four blade sections positioned at right angles to each other around a central spline. In one example, the overall length of a control rod blade is approximately twelve feet, while its maximum cross sectional dimension, i.e. twice the width of a blade section, may be on the order of ten inches. A typical control rod blade further comprises an upper handle positioned above the aforesaid main blade structure, upper ball rollers and a lower casting including a velocity limiter.

Each fuel channel of a boiling water reactor typically consists of a hollow, linear, elongate, 4-sided channel of integral construction, which, except for its rounded corner edges, has a substantially square cross section. Each channel may be roughly fourteen feet long by five inches square.

Heretofore, one technique for reducing the volume of a spent control rod blade has been to sever the upper and lower portions from the control rod blade. In the remaining main blade structure the individual blade sections are then removed from the central spline by longitudinal cuts and the separate parts are then stacked and buried together. Since the blades enclose neutron absorber rods which contain radioactive gas, these latter cuts must be made quite near the central spline. The cuts are very difficult and time consuming to carry out because the nozzle of a cutting torch or the blade of a saw can not easily be fitted into the restricted region where the cut must be made.

A commonly practiced technique for reducing the volume of a spent fuel channel has been to crush it into a generally flat configuration. This process often yields random shaped and nonuniform configurations which are difficult to compact in close proximity to each other. Further, the process is prone to create loose segments of the radioactive metal and special care is required to store these pieces together with the crushed fuel channel.

OBJECTS OF THE INVENTION

It is a primary object of the present invention to provide a new and improved method of compacting the control rod blades and fuel channels of a nuclear reactor which avoids the disadvantages and limitations of the prior art.

It is another object of the present invention to provide a new and improved method of compacting the control rod blades and fuel channels of a boiling water reactor which simplifies their processing and handling and, thus, reduces the cost of disposing of these parts.

It is another object of the present invention to provide a new and improved method of compacting the control rod blades and fuel channels of a boiling water reactor into a smaller volume than was heretofore economically achievable.

SUMMARY OF THE INVENTION

The method in accordance with the present invention permits the storage, in a reduced volume of space, of used boiling water reactor fuel channels and of a portion of the control rod blade which has been exposed to the greatest amount of radioactivity while in use. The upper and lower portions of the control rod are cut away, leaving a substantially cruciform-shaped control rod main blade structure. The fuel channels are each cut into elongate, substantially planar panels of equal size. These panels are then stacked substantially parallel to the axis of the cruciform-shaped structure so as to nest within each other and to fill substantially each of the four quadrants defined by the cruciform structure. Prior to a storage, the stacked panels and the cruciform main blade structure may be secured together.

These and other objects of the invention, together with the features and advantages thereof, will become apparent from the following detailed specification when read in conjunction with the accompanying drawings in which applicable reference numerals have been carried forward.

DETAILED DESCRIPTION OF THE INVENTION

Figure 1:
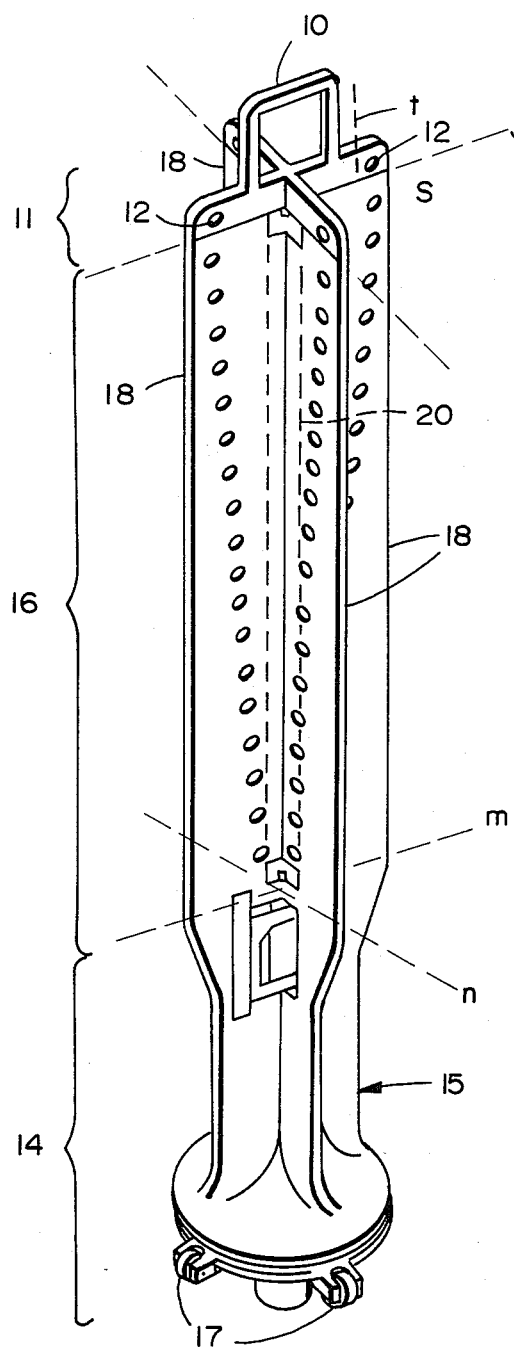
FIG. 1 illustrates a boiling water reactor control rod blade of the type to which the present invention is applicable.

FIG. 1 illustrates a control rod blade of the type to which the present invention is applicable. As shown, the control rod blade comprises an upper portion 11 consisting of an upper handle 10 and four upper ball rollers 12, a lower portion 14 consisting of lower casting 15 and lower rollers 17, and main blade structure 16. The main blade structure includes four blades 18 arranged in a cruciform shape about a central spline 20. According to one embodiment of the invention, lower portion 14 is removed by cutting approximately in the plane defined by lines m and n, and upper portion 11 is removed by cutting in a transverse plane defined by lines j and k. As an alternative, handle 10 may be cut away and rollers 12 may be removed by cutting at lines s and t.

Still another alternative is to retain handle 10 and to remove only rollers 12. Although it is possible to practice the invention without removing even these rollers, it is desirable to do so since they typically contain cobalt and are radioactively much hotter than the other portions of the control rod blade. When removed, the rollers are disposed of separately from the outer components.

Figure 2:
FIG. 2 illustrates a boiling water reactor fuel channel for use in a reactor which employs control rod blades of the type shown in FIG. 1.

FIG. 2 illustrates a linear, elongate, 4-sided, hollow fuel channel 22 of the type which may be used with the control rod blade shown in FIG. 1. The channel is preferably of an integral construction, i.e. the planar panels 23 are integrally joined to each other at the rounded corner edges 26. A structure of substantially rectangular cross section is thus defined. Preferably all four panels have identical dimensions so as to provide a uniform, substantially square cross section throughout the length of the channel.

Figure 3:
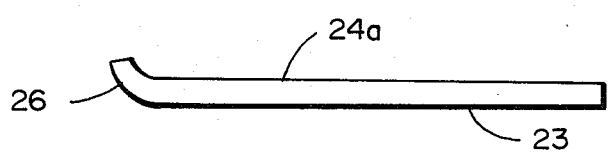
FIG. 3 illustrates an end view of a sectioned member of the fuel channel illustrated in FIG. 2, cut in accordance with one embodiment of the invention.

In accordance with one embodiment of the invention the channel is sectioned along its entire length at each of lines p. As shown in FIG. 2, each line p is located adjacent and parallel to the corner edges 26. As shown in FIG. 3, each of the resulting channel members 24a thus comprises one elongate planar panel 23 and one complete corner edge 26.

Figure 4:
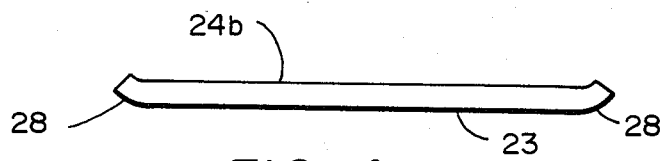
FIG. 4 illustrates an end view of a sectioned member of the fuel channel illustrated in FIG. 2, cut in accordance with a further embodiment of the invention.

In accordance with another embodiment of the invention channel 22 is sectioned along its entire length along a pair of mutually perpendicular diagonal planes. These planes are defined by lines q and q', and r and r' respectively, as shown in FIG. 2. Thus, a pair of diagonally opposite corner edges can be simultaneously cut in half when this technique is employed. Thereafter, each 2-panel section resulting from the aforesaid cut is separately cut in half along its corner edge to obtain four single-panel channel members 24b. As shown in FIG. 4, each of channel members 24b comprises one elongate planar panel 23 bordered on opposite sides by portions 28 of the corner edges.

Figure 6:
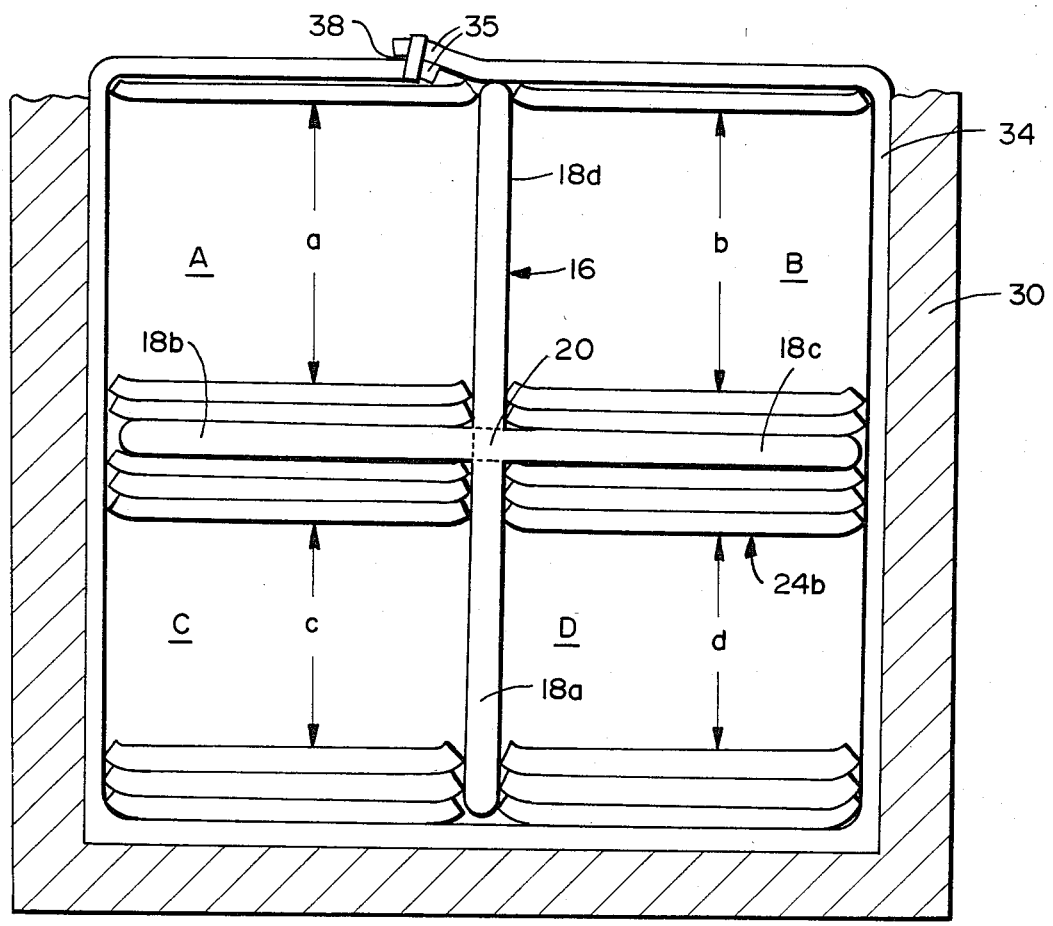
FIG. 6 illustrates in cross-sectional side view a container in which horizontally disposed fuel channel members are disposed in stacked arrangement in the respective quadrants of the cruciform main blade structure.

The fuel channel members, being only about 90 mils thick, tend to be quite flexible. After use in a nuclear reactor such members become brittle, making vertical stacking of the used members difficult. Therefore, in a preferred embodiment of the invention, the channel members are horizontally stacked so as to lie on top of each other. As shown in FIG. 6, the cruciform-shaped main blade structure 16 defines four quadrants designated A, B, C, D. In accordance with the present invention, the channel members are disposed in stacked, nested arrangement in each of these quadrants, parallel to the long axis of main blade structure 16. In one example, a total of thirty-two channel members may be stacked horizontally in each of quadrants A, B, C and D. The main blade structure thus determines the stacking arrangement, as well as providing the central support for the stacked channel members.

Stacking as well as securing of the sectioned channel members and the main blade structure are facilitated, according to one embodiment of the invention, by means of an elongate box 30 of rectangular cross section. This is illustrated in FIG. 6, wherein by way of example, channel members of the type shown in FIG. 4 are seen to be stacked. Box 30 is placed so that its long axis is horizontally positioned. The box provides an external form in which to stack channel members 24b. A set of strapping bands 34 is used, each being positioned flat against the bottom of the box and against the vertical interior box surfaces 31. Strapping bands 34 are disposed generally perpendicular to the long axis of the box at intervals along the axis. The number of bands required per box will depend on the experience of the operator. After all four quadrants are filed, each pair of ends 35 of a strapping band is fastened together, as shown in FIG. 6, to secure the channel members and main blade structure to each other within the box. In an alternative embodiment, box 30 serves as both an external form for purposes of stacking and as the securing means.

Figure 5:
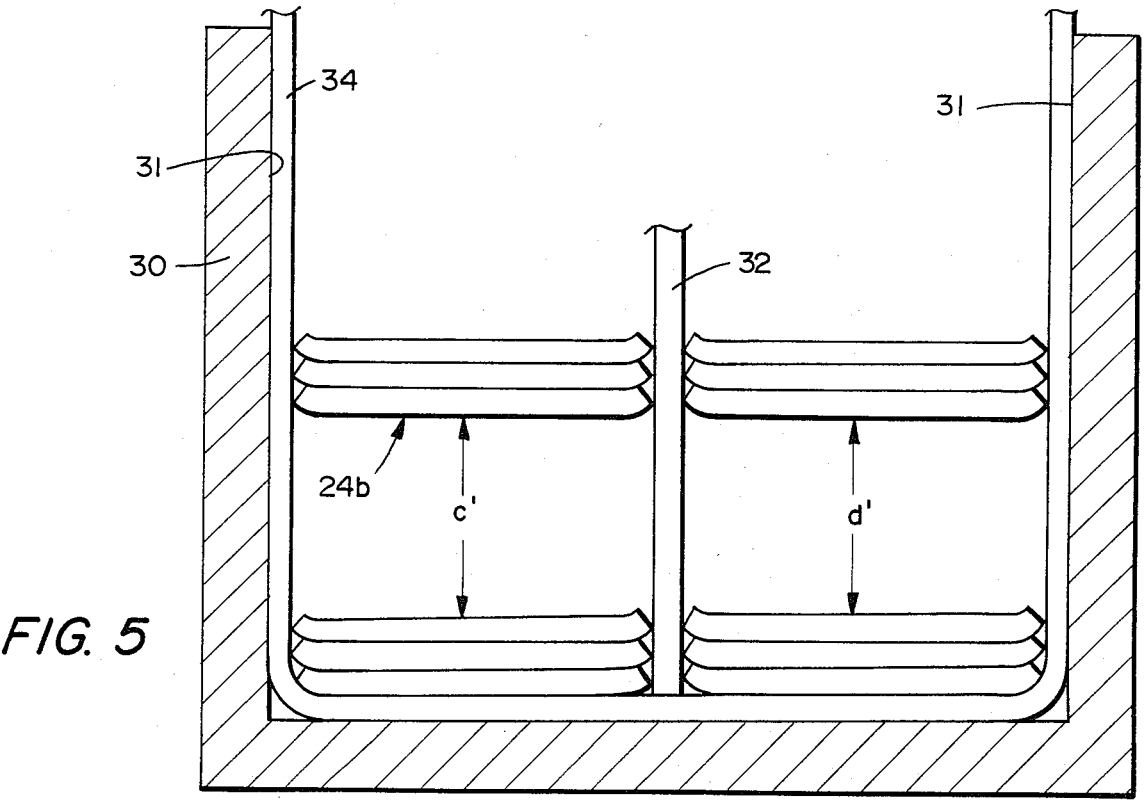
FIG. 5 illustrates in cross-sectional side view a container in which horizontally disposed fuel channel members are arranged in two separate stacks.

In practice, the channel members are horizontally stacked in the lower portion of elongate box 30 after bands 34 have been put in place. As shown in FIG. 5, a removable central divider 32 of a thickness substantially equal that of fuel channel blade 18, may be temporarily placed into box 30 to help form two separate stacks c and d of channel members and to maintain a space between the stacks. After both stacks reach a height approximately equal to the width of a control rod blade 18, divider 32 is removed. Main blade structure 16 is then emplaced in box 30 in a manner whereby blade 18a fills the void left by withdrawn divider 32 and blades 18b and 18c top stacks c and d respectively, as shown in FIG. 6. Quadrants A and b are now filled by stacking fuel channel members upon the base established by baldes 18b and 18c. When all quadrants are filled, ends 35 of each strapping band 34 are fastened together e.g. by means of a fastener 38 or the like, to secure the channel members of each of stacks a, b, c and d to main blade structure 16. The resulting bundle can either be removed from the box for transport to its ultimate disposal site, or it may be retained in the box and thus transported and/or disposed. In the latter case the strapping bands are optional since a closely fitting container and a suitable cover will be used.

It will be apparent to those skilled in the art that the present invention is not limited to the embodiment hereinabove described and shown. For example, it is possible to stack channel members in fewer than all four quadrants of the main blade structure and to use the remaining quadrants to stack other parts of the reactor. It is also possible to stack channel members in parallel nested relationship in the main blade structure portion 16 of the complete control rod blade, without removing the upper and lower portions of the latter. To do so, the channel members must be stacked clear of the lower casting and will therefore protrude beyond the handle 10. Other methods of compact storage of the channel members in the respective quadrants of the main blade structure are also possible. For example, if the fuel channels are sufficiently rigid, vertical stacking of the channel members is possible and may afford easier handling during the stacking process. Although FIGS. 5 and 6 illustrate the stacking of channel members sectioned in accordance with the embodiment of FIG. 4, it will be clear that channel members as illustrated in FIG. 3 may also be stacked in nesting relationship.

It will be understood that the dimensions and proportional structural relationships in the drawings are illustrated by way of example only and that these illustrations are not to be taken as the actual dimensions or proportional structural relationships used in the method of the present invention.

While certain embodiments of the present invention have been disclosed herein, it will be clear that numerous modifications, variations, changes, full and partial equivalents will now occur to persons skilled in the art without departing from the spirit and scope of the invention. Accordingly, it is intended that the invention be limited only by the spirit and scope of the appended claims.

I claim:

1. A method of compacting used control rod blades and fuel channels of the type employed in a boiling water reactor, each of said control rod blades comprising an elongate main blade structure of substantially uniform, cruciform cross section to define four quadrants, each control rod blade further including upper and lower portions at opposite ends of said main blade structure which depart from said cruciform cross section, each of said fuel channels including an elongate, hollow structure having a substantially square, uniform cross section throughout its length defined by identical, planar panels integrally joined at the rounded corner edges of the channel;

said method comprising the steps of:

removing said upper and lower portions from each of said control rod blades to retain said main blade structure;

sectioning each of said fuel channels into a plurality of elongate channel members; and stacking said channel members so as to position them within the respective quadrants of said retained main blade structure substantially parallel to the long axis of said structure.

2. A method as recited in claim 1, wherein each of said fuel channels is sectioned substantially parallel to its own axis such that each channel member includes a single elongate panel and at least a portion of a corner edge; and wherein each of said channel members is stacked to nest in contact with its adjacent channel members substantially throughout its full length.

3. A method as recited in claim 2, wherein said channel members are stacked horizontally to lie on top of each other.

4. A method as recited in claim 2, wherein each of said fuel channels is sectioned along said corner edges in a pair of mutually perpendicular, diagonal planes.

5. A method as recited in claim 2, wherein each of said fuel channels is sectioned in each panel adjacent and parallel to a corner edge.

6. A method as recited in claim 3, wherein the width of the blades of said cruciform cross section is substantially equal to the width of said sectioned channel members;

said method further comprising the step of securing said stacked channel members and said main blade structure together.

7. A method as recited in claim 6, wherein said securing step includes strapping said stacked channel members to said main blade structure.

8. A method as recited in claim 3, wherein the width of the blades of said cruciform cross section is substantially equal to the width of said channel members; and wherein said channel members are stacked into a closely fitting container with said main blade structure to secure them together.

9. A method as recited in claim 3, wherein the width of the blades of said cruciform cross section is substantially equal to the width of said channel members; and wherein said stacking step includes:

stacking said channel members into two stacks in a closely fitting container on opposite sides of a removable divider, the height of said stacks being substantially equal to said blade width;

removing said divider;

emplacing said main blade structure in said container with one of the vertically positioned blades substantially filling the void left by said divider and with the horizontally positioned blades topping said stacks; and stacking said sectioned channel members into the remaining two quadrants of said main blade structure on top of said horizontally positioned blades.

10. A method of compacting used control rod blades and fuel channels of the type employed in a boiling water reactor, each of said control rod blades comprising an elongate main blade structure of substantially uniform, cruciform cross section to define four quadrants, each control rod blade further including upper and lower portions at opposite ends of said main blade structure which depart from said cruciform cross section, each of said fuel channels including an elongate, hollow structure having a substantially square, uniform cross section throughout its length defined by identical, planar panels integrally joined at the rounded corner edges of the channel;

said method comprising the steps of:

removing said upper and lower portions from each of said control rod blades to retain said main blade structure;

sectioning each of said fuel channels into a plurality of elongate channel members;

stacking said channel members horizontally within the respective quadrants of said retained main blade structure substantially parallel to the long axis of said structure in nesting relationship to each other; and securing said channel members and said main blade structure together.

11. A method of compacting used control rod blades and hollow, linear fuel channels of the type employed in a boiling water reactor, each of said control rod blades including an elongate main blade structure of substantially uniform, cruciform cross section to define four quadrants, each of said hollow fuel channels having a substantially uniform, rectangular cross section throughout its length;

said method comprising the steps of:

sectioning each of said fuel channels into a plurality of elongate channel members; and stacking said channel members in said quadrants substantially parallel to the long axis of said main blade structure.

12. A method as recited in claim 11, wherein each of said fuel channels is sectioned in a direction substantially parallel to its own axis; and wherein said channel members are stacked in nesting relationship with each other.

13. A method as recited in claim 12, wherein said channel members are stacked horizontally to lie on top of each other.

14. A method as recited in claim 11, and further comprising the step of securing said stacked channel members and said main blade structure together.

15. A method as recited in claim 12, wherein each of said control rod blades further includes upper and lower portions at opposite ends of said main blade structure;

said method further comprising the step of severing at least one of said portions of said control rod blade prior to stacking.

* * * * *